US007207006B1

(12) United States Patent
Feig et al.

(10) Patent No.: US 7,207,006 B1
(45) Date of Patent: Apr. 17, 2007

(54) RUN-TIME HYPERVIDEO HYPERLINK INDICATOR OPTIONS IN HYPERVIDEO PLAYERS

(75) Inventors: Ephraim Feig, San Diego, CA (US); Jeane Shu-Chun Chen, San Diego, CA (US); Yimin Gan, Beijing (CN); Dong Xie, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 420 days.

(21) Appl. No.: 09/654,205

(22) Filed: Sep. 1, 2000

(51) Int. Cl.
*G11B 27/00* (2006.01)
(52) U.S. Cl. .................. 715/723; 715/724; 715/726
(58) Field of Classification Search ................ 345/589, 345/619, 716, 719, 720–723, 764, 810, 821–824, 345/835, 856; 715/501.1, 513, 539, 854, 715/723, 724, 726
See application file for complete search history.

(56) References Cited

U.S. PATENT DOCUMENTS

| 4,808,984 | A | * | 2/1989 | Trueblood et al. .......... 345/214 |
| 5,819,092 | A | * | 10/1998 | Ferguson et al. ........... 717/113 |
| 5,918,012 | A | * | 6/1999 | Astiz et al. ................. 345/744 |
| 5,966,121 | A | * | 10/1999 | Hubbell et al. ............. 345/726 |
| 5,987,509 | A | | 11/1999 | Portuesi |
| 6,006,265 | A | * | 12/1999 | Rangan et al. .............. 709/226 |
| 6,088,707 | A | * | 7/2000 | Bates et al. ................. 715/513 |

(Continued)

FOREIGN PATENT DOCUMENTS

EP  0 483 576  5/1992

(Continued)

OTHER PUBLICATIONS

Dimitrova et al., Visual Associations in Deja Video, 1998, pp. 1-11.*

(Continued)

*Primary Examiner*—Weilun Lo
*Assistant Examiner*—Truc T. Chuong
(74) *Attorney, Agent, or Firm*—Ohlandt, Greenley, Ruggiero & Perle, L.L.P.; Daniel P. Morris, Esq.

(57) ABSTRACT

A hypervideo player for playing hypervideos containing both video and hypervideo hyperlinks provides user selectable run-time options for the form of hypervideo hyperlink emphasis region display attributes displayed at the time of viewing. The hypervideo player may reside on a host system. The hypervideo player integrates video file(s) and hypervideo hyperlink data file(s) to form a hypervideo. The hypervideo player decodes a video file, encodes the decoded video file with a corresponding hypervideo hyperlink data file at key frames of the video file to form a hypervideo, displays the hypervideo on a display device and provides the user, at the time of viewing, with at least one user selectable option for the form of hypervideo hyperlink emphasis region display attributes. The hypervideo player preferably employs interpolation between key frames to determine the display position of the hypervideo hyperlink emphasis region(s) in non-key frames of the hypervideo. The use of key frame encoding and interpolation to determine the display position between key frames, enable the hypervideo hyperlink emphasis region(s) to be displayed at all desired locations of the hypervideo even though the hypervideo hyperlink data is encoded only at key frames.

12 Claims, 9 Drawing Sheets

U.S. PATENT DOCUMENTS

| | | | | |
|---|---|---|---|---|
| 6,154,771 | A * | 11/2000 | Rangan et al. | 345/660 |
| 6,175,840 | B1 * | 1/2001 | Chen et al. | 345/803 |
| 6,204,842 | B1 * | 3/2001 | Fujii | 715/717 |
| 6,585,776 | B1 * | 7/2003 | Bates et al. | 715/513 |
| 7,000,242 | B1 * | 2/2006 | Haber | 715/719 |

FOREIGN PATENT DOCUMENTS

| | | |
|---|---|---|
| EP | 0 840 241 | 5/1998 |
| EP | 0 982 947 | 3/2000 |
| WO | WO 98/44435 | 10/1998 |

OTHER PUBLICATIONS

Mitsubishi Electric America, Inc., Authoring with Hyperlinked Video, White Paper, 1998, pp. 1-13.*

Chen et al., Video and Audio: Organization and Retrieval in the WWW, 1995, pp. 1-17.*

Mark R. Brown, Using Netscape 2, Que Corp, Special Edition, and p. 167.*

NEC's Video Hypertext System, Newsbytes News Network, Jul. 31, 1995, 1 pg.

"HyperCafe: Narrative and Aesthetic Properties of Hypervideo," (N. Hawhney et al., Hypertext '96: Seventh ACM Conference on Hypertext, Mar. 20, 1996, 18 pp.

"RealVideo Technical White Paper," Progressive Networks, Inc., 8 pp., Publication Date Unknown.

"V-Active 1.0 Beta 3, Time Limit Demo," V-Active Home Page, AndNetVer, 2 pp., Publication Date Unknown.

* cited by examiner (A) MPEG FORMATTED VIDEO FILE
(B) MPEG FORMATTED DATA FILE (A) STRUCTURE FOR ENCIODED HYPERLINK DATA FILE (B) STRUCTURE FOR OBJECT OB(j)

(C) STRUCTURE FOR IDENTIFIERS L(j,k)

RUN-TIME HYPERVIDEO HYPERLINK INDICATOR OPTIONS IN HYPERVIDEO PLAYERS

BACKGROUND OF THE INVENTION

1. Field of the Invention

The present invention relates to video players and editors and, in particular, to a hypervideo system and method of playing and creating hypervideos.

2. Description of the Related Art

The Internet and its associated World Wide Web (Web) are well known. The Internet and the Web are distributed networks of computers, including servers and clients. Also well known are the techniques for navigating the Web via computers employing graphical user interfaces (GUI). The more common techniques include the processes of "point and click" and "click and drag" to select, activate and implement actions via GUIs. Instead of typing commands to specify actions or instructions, a user, via a GUI, typically executes a point and click maneuver or other techniques to activate the command/instruction represented by an icon.

Hypertext formatted documents and hyperlinks are also known from viewing hypertext documents on the Web. Hypertext formatted documents contain hyperlinks to other documents and files. Hyperlinks specify the name and location of documents and files using Uniform Resource Locators (URLs). URL is a standard for specifying an object on the Internet. It specifies an access method and location for files. Since a URL specifies the location of files, URLs are commonly referred to as the address for the files linked via hyperlinks. The linked document(s) and file(s) may be located locally or, more typically, remotely on the Internet. Selection of a hyperlink typically downloads document(s) and/or image(s) specified by the associated URL for local viewing at the user's display.

The text comprising a hyperlink is usually indicated by some form of display attribute, which delineates the hyperlink text from the surrounding text. The form of the hyperlink display attribute can vary. Typically, the text of a hyperlink is displayed as a specific color of text (e.g., blue text) and/or underlined text. A hyperlink may link to local or remotely located audio, video or image files. Hyperlinks enable easy navigation of the Web as well as the cross-referencing of hypertext formatted documents.

Hypermedia is generally used to describe the fusion of two technologies, namely the multimedia and hypertext technologies. Multimedia technology refers to information formats containing a combination of text, images, graphics, audio and/or video. While hypertext technology, as described above, is most commonly known from viewing text-based documents on the Web, hypertext technology may also be incorporated with animation and video. Hypermedia documents are hypertext documents with multimedia capabilities. Hypermedia documents may contain a combination of text, video, images, audio and hypertext. Hypervideo, as used herein, refers to a video augmented with hyperlinks. For example, a description of hypervideo may be found an article entitled: "NEC's Video Hypertext System", Newsbytes News Network, Jul. 31, 1995.

A hypervideo displays both video images and hyperlinks. The hyperlinks in hypervideos are referred to herein as hypervideo hyperlinks. A hypervideo hyperlink is generally displayed concurrently on or near the video images associated with the hypervideo hyperlink. Conventional hypervideo players display hypervideo hyperlinks at the display position and in the particular format designated by the creators of the hypervideo. The display location and the form of hypervideo emphasis displayed are fixed (i.e., static).

Similar to a hypertext hyperlink in a hypertext document, a hypervideo hyperlink in a hypervideo is often indicated by a hypervideo hyperlink emphasis region. The display attributes of the hypervideo hyperlink emphasis region delineate the hypervideo hyperlink from the surrounding video, thereby providing a visual indicator of those portions of the hypervideo having hypervideo hyperlinks embedded therein.

The hypervideo hyperlink emphasis region may be displayed as a visually distinctive border or background color that delineates the region wherein one or more hypervideo hyperlinks are located. The information linked via hyperlink to a segment of video in a hypervideo typically contains information related to the images displayed in or near a hypervideo hyperlink emphasis region. The linked content may include information in the form of text, audio, video, two- or three-dimensional images or a combination thereof.

HyperCafe is an experimental hypermedia prototype, developed to illustrate a general hypervideo system. This program places the user in a virtual cafe, which is composed primarily of digital video clips of actors involved in fictional conversations in the cafe. HyperCafe allows the user to follow different conversations, and offers dynamic opportunities of interaction via temporal, spatio-temporal and textual links to present alternative narratives. HyperCafe is discussed in an article entitled: "HyperCafe: Narrative and Aesthetic Properties of Hypervideo," (N. Sawhney et al., Hypertext'96: Seventh ACM Conference on Hypertext, Mar. 20, 1996.

V-Active is an authoring tool for the creation of interactive movies. V-Active is part of MediaBuilder by Veon Technologies. It uses the HyperVideo technology to identify hypervideo hyperlinks in digital video files. The tool allows a user to prepare video clips with the hypervideo hyperlink information and then to link the hypervideo hyperlinked video clips to other types of media.

Progressive Networks, Inc. has included "click-able video maps" in their RealVideo technology. A mouse click on a portion of the video can cause a new video clip to be played, or a seek to be performed within a current clip, or a URL message to be sent. Progressive Networks, Inc provides the RealPlayer which enables this interactivity. A description of RealVideo may be found in "RealVideo Technical White Paper".

There are several perceived problems with conventional hypermedia technology. First, conventional hypervideo players require extensive resources in order to process hypervideos. This is because the hypervideo hyperlink information encoded in hypervideos is encoded in each frame of the hypervideo having associated hypervideo hyperlink(s). A video file comprises a plurality of single still image frames. When the single video images are displayed contiguously at a sufficiently high frame rate (e.g., 25–30 frames per second), then the displayed single images are perceived as full motion video. The term frame number refers to the number of a video frame in a sequence of contiguous video still image frames (i.e., a video). Therefore, in a conventional hypervideo the hypervideo hyperlink information is encoded in each frame (e.g., 25–30 frames/second) of the hypervideo having associated hypervideo hyperlink(s) therein. The resources required to encode and process (i.e., play) conventional hypervideos is therefore extensive.

Second, conventional hypervideo players are static devices. That is, they cannot alter the manner in which the hypervideo hyperlink emphasis information is displayed and do not provide the user with control over the hypervideo display. Therefore, a user employing traditional hypervideo players is constrained to viewing the hypervideo hyperlink emphasis forms chosen by the creator of the hypervideo.

SUMMARY OF THE INVENTION

A hypervideo player for playing hypervideos containing both video and hyperlinks provides user-selectable run-time options for the form of hypervideo hyperlink emphasis region display attributes displayed. The hypervideo player typically resides on a host system. The hypervideo player integrates video file(s) and hypervideo hyperlink data file(s) to form a hypervideo. The hypervideo player decodes a video file, encodes the decoded video file with a corresponding hypervideo hyperlink data file at key frames of the video file to form a hypervideo, displays the hypervideo on a display device and provides the user, at the time of viewing, with at least one user-selectable option for the form of hypervideo hyperlink emphasis region display attribute displayed.

As used herein, the display attributes of a hypervideo hyperlink emphasis region include four main display options: 1) surrounding the hypervideo hyperlink emphasis region with a white border; 2) displaying the hypervideo hyperlink emphasis region as a specific color; 3) displaying the hypervideo hyperlink emphasis region in gray-scale (i.e., black-and-white) video, while the rest of the video is in color; and 4) displaying the hypervideo hyperlink emphasis region in reverse color mode. While only four emphasis options have been discussed, the invention may have more, less and different user-selectable emphasizing options without departing from the scope of the invention.

In accordance with the present invention, the hypervideo hyperlink data is not encoded in each frame of the video file in forming the hypervideo. Rather, the hypervideo hyperlink data is encoded only in certain frames of the video. The video frames encoded with hypervideo hyperlink data are referred to herein as key frames. By encoding the hypervideo hyperlink data in key frames, the hypervideo data file and the resultant hypervideo of the present invention are reduced in size as compared to conventional hypervideo data files and conventionally encoded hypervideos, respectively. The key frame encoding is advantageous since fewer resources are required to encode the hypervideo data file used to produce the hypervideo. Fewer resources are also required to play the resultant hypervideo.

The hypervideo player of the present invention preferably employs interpolation between key frames to determine the display position of the hypervideo hyperlink emphasis region(s) in non-key frames of the hypervideo. The use of key frame encoding and interpolation to determine the display position between key frames, enable the hypervideo hyperlink emphasis region(s) to be displayed at all desired locations of the hypervideo even though the hypervideo hyperlink data is encoded only at key frames. The user-selectable options of the present invention enable users, at the time of viewing, to selectively determine the display attributes of the hypervideo hyperlink emphasis region(s) in the hypervideo.

The hypervideo player may also be used to create and edit hypervideo hyperlink data files and hypervideos. The hypervideo player can create and edit hypervideo hyperlink data files, which in turn can be used to encode a video to form a hypervideo. Both new hypervideo hyperlink data files and preexisting hyperlink data files may be edited using an embodiment of the hypervideo player.

DETAILED DESCRIPTION OF THE INVENTION

Figure 1:
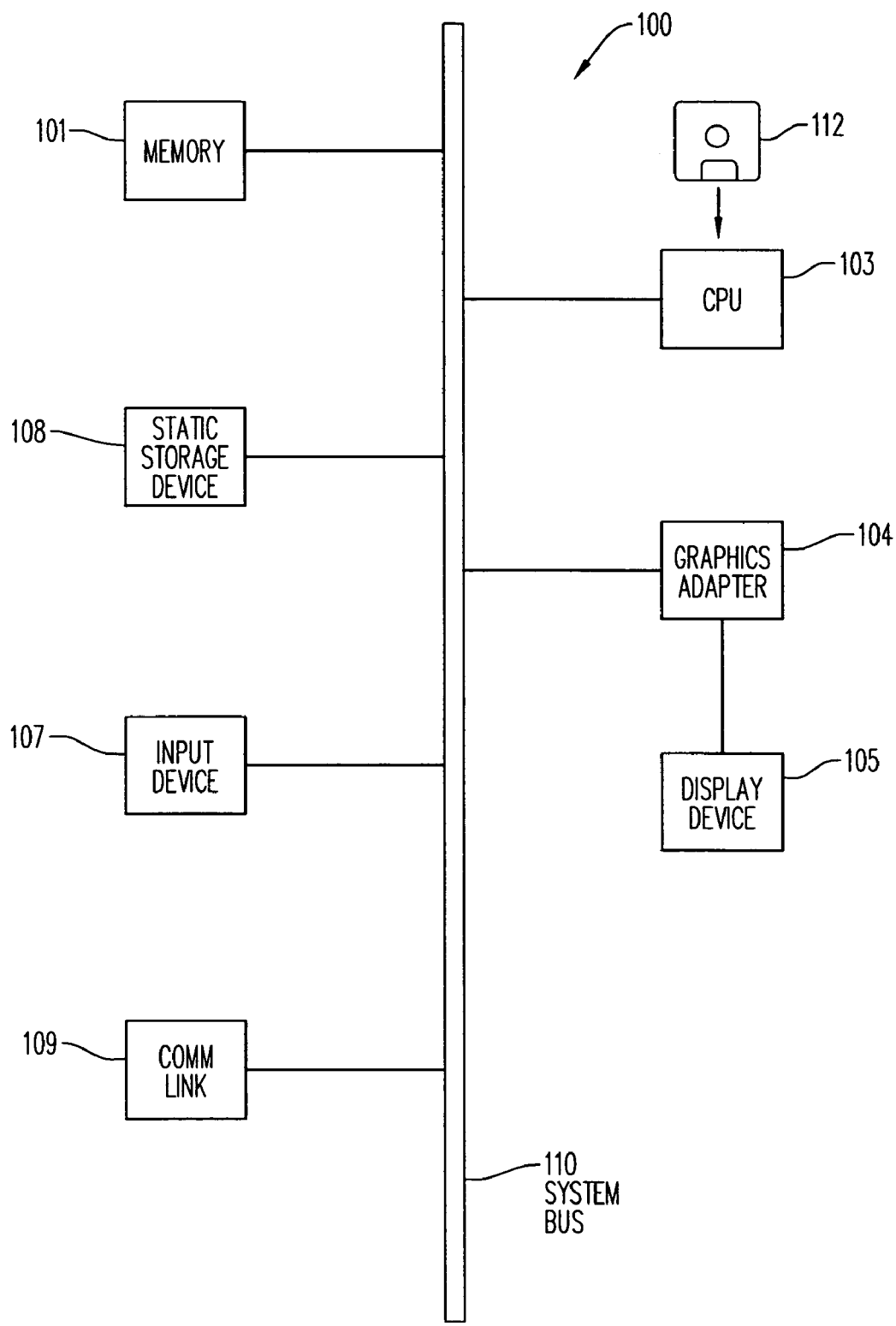
FIG. 1 is a functional block diagram of a computer processing system that can be utilized by an embodiment of the present invention.

The present invention typically resides on a host computer processing system. The host computer processing system may include a personal computer or a workstation. A typical computer processing system compatible with the present invention is shown in FIG. 1. The computer processing system 100 includes at least one central processing unit (CPU) 103, which is coupled via a system bus 110 to a memory 101. Also included in the host computer processing system 100 is at least one user input device 107 (e.g., a keyboard, mouse, joystick, voice recognition system, or handwriting recognition system) that enables a user of the hypervideo player to initiate the hypervideo player and selectively activate at least one user-selectable hypervideo hyperlink emphasis region display attribute option. A non-volatile memory (e.g., ROM) and/or other static storage device 108 (e.g., a fixed hard disk drive) is included in the computer processing system 100 for storing an operating system and application program(s) that are loaded into the memory 101 and executed by the CPU 103. The CPU 103 may use data stored in the nonvolatile storage device 108 and/or the memory 101 to execute the operating system and application program(s).

A removable memory media 112 (e.g., a magnetic disk or a compact disk) may also be included to maintain applications and operating systems previously described as being stored in static storage device 108. In the event that removable memory media 112 is used to store a application for executing the video player of the present invention, the controlling procedures are downloaded from the disk 112 into the CPU 103 and are used to perform the invention.

The computer processing system 100 includes a graphics adapter 104 coupled between the CPU 103 and a display device 105. The application program(s) and/or operating system executed by the CPU 103 generate graphics commands such as, commands to draw a box (or window), to display a bit map image, to render a three-dimensional model, or to display a video file. The graphics commands may be handled by the application program(s)/operating system executed by the CPU 103, or by hardware that works in conjunction with the application program(s)/operating system, wherein the appropriate pixel data is generated and the display device 105 is accordingly updated.

The computer processing system 100 may include a communication link 109 that is coupled to the CPU 103 via the system bus 110. The communication link 109 enables the CPU 103 to communicate with other computer processing systems (e.g., the Internet). The CPU 103 may receive portions of the operating system, portions of the application program(s), including the controlling procedures or portions thereof, for executing the methods of the present invention via the communication link 109.

The application program(s)/operating system executed by the CPU 103 may perform the methods of the present invention described below. The methods or portions thereof described below may be embodied in hardware that works in conjunction with the application program(s)/operating system executed by the CPU 103.

In accordance with the present invention, the hypervideo player integrates a hyperlink data file and a corresponding video file to form a hypervideo file. The hyperlink data file is preferably a separate and distinct file from the video file. The hyperlink data file identifies hyperlinks that will be associated with video images in the corresponding video file. The hyperlinks included in hypervideos are referred to herein as hypervideo hyperlinks. Hypervideo hyperlinks are typically indicated and displayed as a distinguishable region of video so that a hypervideo player user can readily distinguish the portions of the hypervideo having associated hypervideo hyperlinks encoded therein. The distinguishable region of video that identifies the presence of a hypervideo hyperlink is referred to herein as a hypervideo hyperlink emphasis region. The hypervideo hyperlink emphasis region is typically an area of pixels in frames of hypervideo that visually indicate the presence of a hypervideo hyperlink.

Hypervideo Encoding Format

Video files are encoded in various standard video formats, such as AVI, MPEG, raw YUV, and raw RGB. Notwithstanding the particular format employed, formatted video files generally comprise a header containing information describing various features of the video such as the video's frame rate, name, size, etc; encoded pixel data defining the video image; and encoded audio data defining the audio that accompanies the video.

Figure 2:
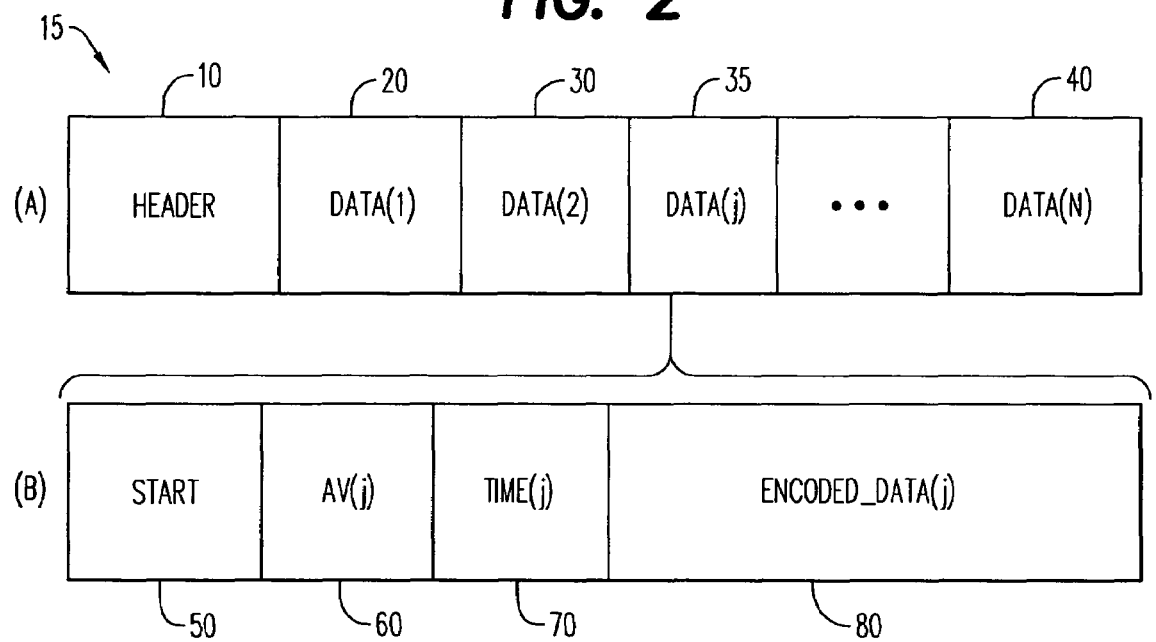
FIG. 2 illustrates the format of an MPEG encoded video file and MPEG encoded data file that can be used in the present invention.

The FIGS. 2(A) and 2(B) illustrate the format of a MPEG encoded video file 5. While a MPEG formatted video file is discussed below, the format of the video file 5 used by the hypervideo player is not limited to MPEG formatted videos. The MPEG formatted video is discussed for purposes of clarity and conciseness in the explanation of the invention and is not a limitation on the present invention. The header 10 contains characteristic information about the video file 5, such as a system clock reference and the video/audio bit rates for the video file. The FIG. 2(A) depicts the header 10 and the data packets 20, 30, 35 . . . 40 comprising the video file 5.

A representative data packet DATA (j) 35, where j=1, 2, . . . N, is shown in greater detail in the FIG. 2(B). The data packet DATA (j) 35 contains the encoded video and audio data. DATA (j) comprises a START 50 field that signals the start of a new data packet; an AV (j) 60 field that identifies the forthcoming data as either audio or video; a TIME (j) 70 field that specifies the timing information necessary to synchronize the video with the audio; and an ENCODED_DATA (j) 80 field that is the actual audio or video data. The encoded video data contains information regarding the pixel color values for each frame of video.

Figure 3:
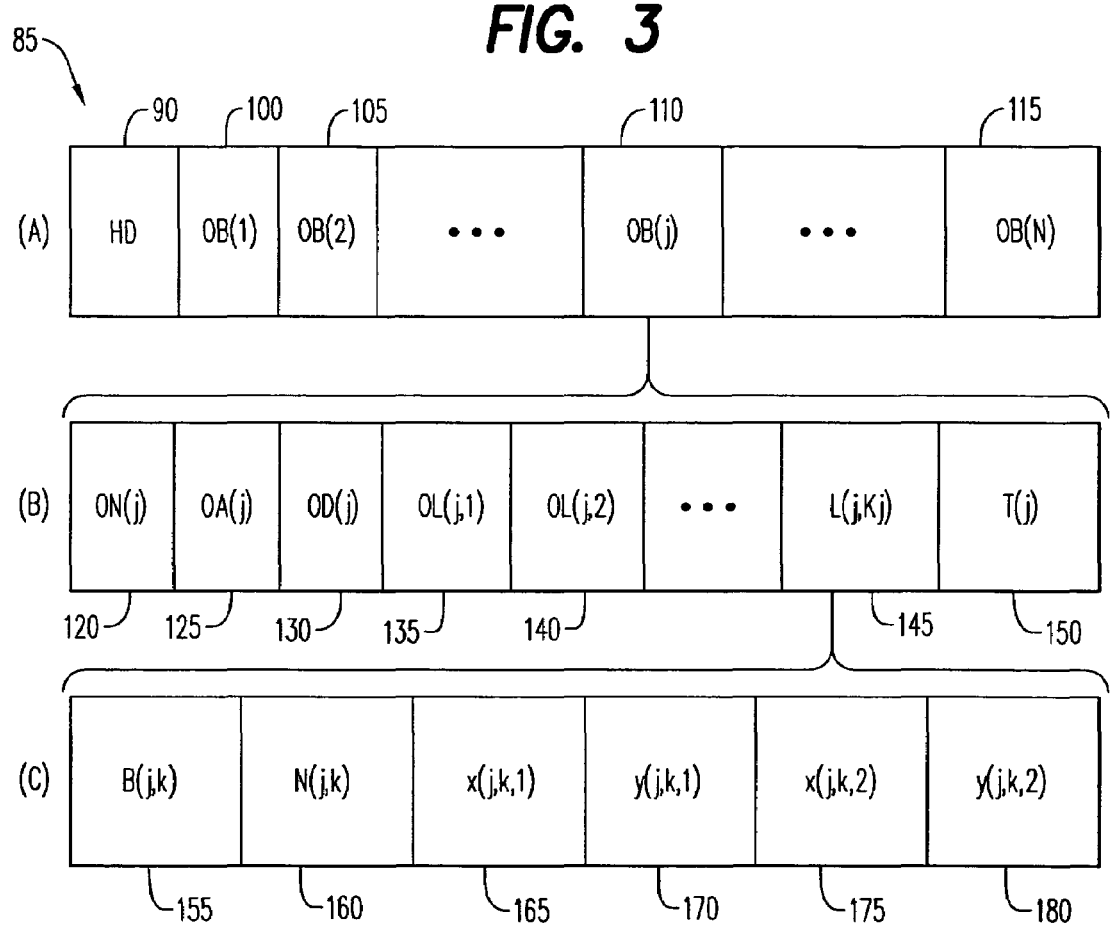
FIG. 3 illustrates the format of a hyperlink data file according to the present invention.

FIGS. 3(A)–3(C) illustrate the format of a hyperlink data file 85 that can be integrated with a video file to form a hypervideo. The video file is encoded with hyperlink information. Referring to FIG. 3(A), the hyperlink data file comprises a header 90 that contains identifying information such as the file's name, size, etc. The information contained in the header 90 is used by the hypervideo player to identify and associate the hyperlink data file 85 with a corresponding video file. In a preferred embodiment, the name of the hyperlink data file is the same as the prefix of the video file's name so that a hyperlink data file can be properly associated with its corresponding video file. For example, if the video file is entitled "title.mpg", then the name of the associated hyperlink data file "title". The header 90 may contain other characteristic video file information for purposes of associating the video file and hypervideo data file to each other. Note however that other file association verification methods may be resorted to without departing from the scope of the present invention.

As shown in the FIG. 3(A), the hyperlink data file 85 is further encoded with object fields OB(1), OB(2) . . . OB(j) . . . OB(N) (100, 105, 110, 115, respectively), for a total of N objects. The object fields each define a hypervideo hyperlink emphasis region display position and size in at least one frame of the associated video file 5. Preferably, the hypervideo hyperlink emphasis regions are defined to have simple geometric shapes. Typically, the hypervideo hyperlink emphasis regions are rectangles with edges lying along the major axes of the display device and specified by top-left and bottom-right pixel coordinates for a given frame of video. By having hypervideo hyperlink emphasis regions of simple geometric shapes, the amount of resources required to sufficiently describe and process the hypervideo hyperlink emphasis regions are minimized. It should be noted however that the particular shape of the hypervideo hyperlinks emphasis regions described herein is not meant to be a limitation on the present invention in any manner. Accordingly, the hypervideo hyperlink emphasis regions will be presented herein as having simple geometric boundaries primarily for illustrative purposes of clarity and conciseness, and not as limitations of the invention.

As described above, the hypervideo hyperlink emphasis region preferably has a rectangular geometry. However, the present invention is not limited in this respect. Thus, a hypervideo hyperlink emphasis region may have any geometry. For example, a hypervideo hyperlink emphasis region may have a circular geometry, and therefore be defined by specifying the location of the circle's center and the radius of the circle.

The object OB(j) 110 (where j=1, 2, . . . N), is a representative object field for the hyperlink data file 85. A detailed depiction of the object OB(j) 110 encoding is provided in the FIG. 3(B). The FIG. 3(B) shows that the object OB(j) 110 is preferably encoded with an object name identifier ON(j) 120, an associated objet link address OA(j) 125, an associated object descriptor OD(j) 130, a list L(j,k) of hypervideo hyperlink emphasis region identifiers 135, and a trailer T(j) 150 that demarcates the end of the encoding for the $j^{th}$ object.

The hypervideo hyperlink emphasis region identifier L(j, k) for an object specifies the spatial display position of the hypervideo hyperlink emphasis region in a particular key frame. The format of the hypervideo hyperlink emphasis region identifier L(j,k) is shown in greater detail in the FIG.

3(C). The hypervideo hyperlink emphasis region identifier L(j,k) comprises four types of information for describing a hypervideo hyperlink emphasis region. The hypervideo hyperlink emphasis region identifier L(j,k) preferably comprises 1) an end frame indicator bit B(j,k) that specifies whether the key frame is an end frame; 2) a frame number N(j,k) of the $k^{th}$ key frame for the $j^{th}$ object; 3) the top-left vertex coordinates (x(j,k,1), y(j,k,1)) of the rectangle that defines the hypervideo hyperlink emphasis region in the $k^{th}$ key frame for the $j^{th}$ object; and 4) the bottom-right vertex coordinates (x(j,k,2), y(j,k,2)) of the rectangle that defines the hypervideo hyperlink emphasis region in the $k^{th}$ key frame for the $j^{th}$ object. The numbers N(j,k) correspond to the frame numbers, which are key frames or end frames for the $j^{th}$ object.

The following table summarizes the encoded hyperlink data file data fields comprising the hyperlink data file in the FIGS. 3(A)–3(C).

TABLE 1

| DATA FIELD | DESCRIPTION (For the $j^{th}$ Object) |
|---|---|
| HD | contains characteristic information that identifies the corresponding video file |
| OB (j) | identifies a link command to execute upon activation of the hypervideo hyperlink |
| ON (j) | the object's name |
| OA (j) | identifies the object's link address |
| OD (j) | gives a description of the linked file |
| L (j, k) | identifies the $k^{th}$ key frame used in encoding the $j^{th}$ object |
| B (j, k) | identifies whether the $k^{th}$ key frame is an end frame |
| N (j ,k) | the frame number of the $k^{th}$ key frame |
| x (j ,k, 1) | the top-left x-coordinate of the rectangular hypervideo hyperlink emphasis region defining the hypervideo hyperlink emphasis region in the $k^{th}$ frame for the $j^{th}$ object |
| y (j, k, 1) | the top-left y-coordinate of the rectangular hypervideo hyperlink emphasis region defining the hypervideo hyperlink emphasis region in the $k^{th}$ frame for the $j^{th}$ object |
| x (j ,k, 2) | the bottom-right x-coordinate of the rectangular hypervideo hyperlink emphasis region defining the hypervideo hyperlink emphasis region in the $k^{th}$ frame for the $j^{th}$ object |
| y (j ,k, 2) | the bottom-right y-coordinate of the rectangular emphasis region defining the hypervideo hyperlink emphasis region in the $k^{th}$ frame for the $j^{th}$ object. |

Figure 4:
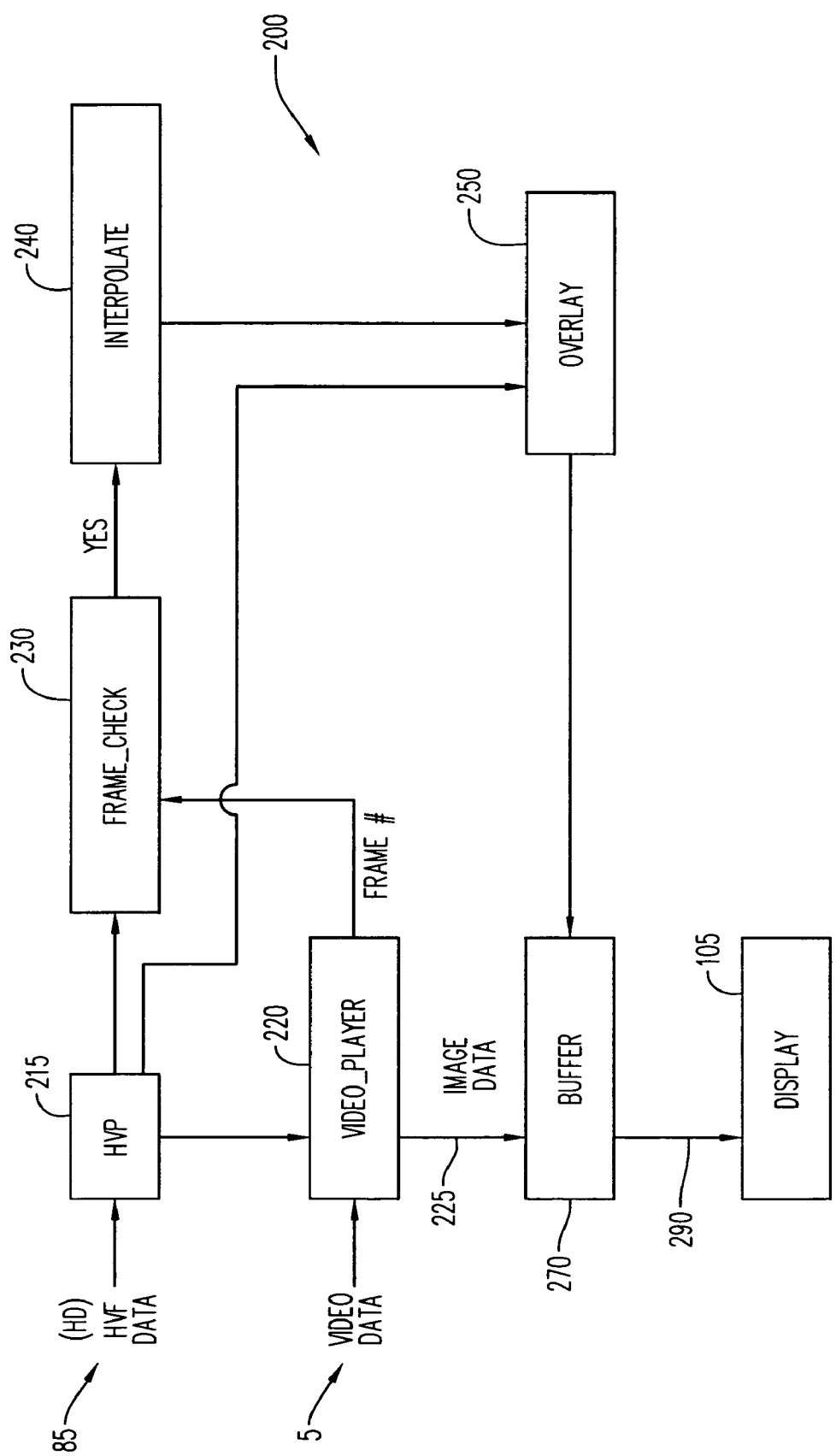
FIG. 4 is a functional block diagram illustrating a video player of the present invention for integrating a video file with the hypervideo data file of FIG. 3.

A functional block diagram of a hypervideo player 200 of the present invention is shown in the FIG. 4. The hypervideo player 200 takes a video file 5 and an associated hyperlink data file 85 and integrates the hypervideo hyperlink information contained in the hypervideo data file 85 with the video file 5 to produce play a hypervideo 290. The hyperlink data file 85 and the video file 5 are formatted as previously described above.

Referring now to FIG. 4, the Hypervideo_Player 215 function determines which video file to associate with the hyperlink data file 85. As previously discussed, the hyperlink data file's header 90 information is typically used to associate a video file and a hyperlink data file to each other. The Hypervideo_Player 215 function sends a message to the VIDEO_PLAYER 220 function, instructing the VIDEO_PLAYER 220 function to open a particular video file. If the properties of the video file 5 match those described in the hyperlink data file header 90, then the VIDEO_PLAYER 220 function starts playing the video file 5. Otherwise, the VIDEO_PLAYER 220 function may query the user to find and/or specify the appropriate video file. Preferably, the Hypervideo_Player 215 function also parses the data and arranges it in a format which makes searching through it simpler.

The process of playing a hypervideo continues with the VIDEO_PLAYER 220 function decoding the video file 5. Decoding video encompasses separating the video image from the video data of a video file frame by frame. At each frame comprising the video file 5, the VIDEO_PLAYER 220 function sends the frame number to the FRAME_CHECK 230 function stage. In the process of decoding the video file, frames of video may be dropped so that frame numbers provided to the FRAME_CHECK 230 function are not consecutive. However, there is no requirement for the frame numbers to be consecutive in order for the present invention to operate. After decoding a frame, the VIDEO_PLAYER 220 function outputs the frame image data of the video to the BUFFER 270 function.

Note, the more specific details of the video decoding performed by the VIDEO_PLAYER 220 function are not critical to the present invention. The present invention may be used with any VIDEO_PLAYER 220 function that decodes frames of a video file and outputs the frame image data to persistent memory. An example of such a VIDEO_PLAYER function is the Active Movie Video Player provided by Microsoft Corporation in the Active Movie Software Development Kit.

The FRAME_CHECK function 230 receives hyperlink data from the HYPERVIDEO_PLAYER 215 function and frame number information from the VIDEO_PLAYER 220. The FRAME_CHECK 230 function determines, for each object OB(j) in the hyperlink data file 85, whether the following two conditions are satisfied. The FRAME_CHECK 230 function determines whether:

i) the video frame number is a key frame for that $j^{th}$ object or if the video frame is between two key frames for that object; and ii) whether the first key frame is not an end frame for that $j^{th}$ object.

If the FRAME_CHECK function 230 determines that the above two conditions are true, then the INTERPOLATE 240 function and the OVERLAY 250 function steps are executed for the object for the video file frame being processed.

If the FRAME_CHECK 230 function determines that the two conditions above are not true, then no further action is taken for the object in the present frame, and the frame is displayed as part of the video file display without being processed by the INTERPOLATION 240 and OVERLAY 250 functions.

When the video frame being processed is designated a key frame based on the information encoded in the hyperlink data file, then the hypervideo hyperlink emphasis region is specifically defined for the object in the hyperlink data file. As discussed above, the hypervideo hyperlink emphasis regions are specified only at key frame locations. Thus, the INTERPOLATE 240 function does not perform any processing of the object for key frames since the display position and size of the hypervideo hyperlink emphasis region is explicitly specified in the hyperlink data file at key frames.

In the instance where the FRAME_CHECK 230 function determines that the video frame being processed is not a key frame but is instead between two key frames, and the first of the two key frames is not an end frame, then the INTERPOLATE 240 function is executed to determine the display position for the hypervideo hyperlink emphasis region in the non-key frame video frame. The INTERPOLATE 240 function uses the hypervideo hyperlink emphasis region display position coordinate data from the two key frames that sandwich a non-key frame video frame and their respective frame numbers, to linearly interpolate the display position and size of the hypervideo hyperlink emphasis region for the non-key frames.

The OVERLAY 250 function takes, as inputs, the display position and size information from the INTERPOLATE 240 function and other hyperlink data file information from the HYPERVIDEO_PLAYER 215 function. The OVERLAY 250 function combines the received information and outputs this data to the BUFFER 270 function wherein the video file image 225 from the VIDEO_PLAYER 220 function is modified with the data from the OVERLAY 250 function.

Preferably, the display attributes of the pixels corresponding to the boundaries of the hypervideo hyperlink emphasis region are changed to a certain fixed color by the OVERLAY 250 function. Alternatively, the OVERLAY 250 function may change the brightness and/or hue of the hypervideo hyperlink emphasis region, or use another display attribute to delineate the hypervideo hyperlink emphasis region from surrounding portions of video. The modified video output of the BUFFER 270 function is hypervideo, containing both video and the hypervideo hyperlink emphasis region(s) mapped and displayed at the determined hypervideo hyperlink emphasis region display position(s). The DISPLAY 290 receives the resulting hypervideo data from the BUFFER 270 function and displays the hypervideo on a display device 105.

A detailed description of the INTERPOLATE 240 function is now set forth below to more fully describe the interpolation aspect of the invention. For purposes of the following illustrative discussion, assume that the VIDEO_PLAYER 220 function is displaying and processing the video frame number F and that the FRAME_CHECK function 230 has determined that the frame number F is between the key frame N(j,k) and the key frame N(j,k+1). Note, N(j,k) is the frame number for the $k^{th}$ key frame for the object OB(j) and N(j,k+1) is the frame number for the $(k+1)^{th}$ key frame for the object OB(j). For purposes of the following discussion, also assume that the key frame N(j,k) is not an end frame for the object OB(j), that there is a hypervideo hyperlink emphasis region encoded in the frame number F and that the hypervideo hyperlink points to the address OA(j). The hypervideo hyperlink emphasis region in the following discussion is rectangular and its display position is determined by the INTERPOLATE 240 function in accordance with the following relationships.

Let x(F,1), y(F,1), x(F,2), y(F,2) denote, respectively, the top-left x-coordinate, the top-left y-coordinate, the bottom-right x-coordinate, and the bottom-right y-coordinate for the rectangular hypervideo hyperlink emphasis region encoded in the hyperlink data file for the OB(j) in frame number F, then:

$$x(F,1)=(1-z)*x(j,k,1)+z*x(j,k+1,1);$$

$$y(F,1)=(1-z)*y(j,k,1)+z*y(j,k+1,1);$$

$$x(F,2)=(1-z)*x(j,k,2)+z*x(j,k+1,2);$$

$$y(F,2)=(1-z)*y(j,k,2)+z*y(j,k+1,2);$$

where: $z=(F-N(j,k))/(N(j,k+1)-N(j,k))$; and * denotes multiplication.

The results in the above equations are preferably determined after rounding to nearest integer.

The table 2 below is a listing pertaining to a rectangular hypervideo hyperlink emphasis region encoded in a hyperlink data file. The information in the table will be used to illustrate how the hypervideo player determines the display position and size for a hypervideo hyperlink emphasis region. With reference to table 2 below, the object OB(j) is named ObjectName and is linked to the URL http://www.object_addres.html. The URL_description is a text-based descriptor encoded in the hyperlink data file to provide additional information to the user concerning the hypervideo hyperlink.

TABLE 2

| | Object Name | ObjectName | | |
| | Link | http://www.object_address.html | | |
| | Description | URL_description | | |
| KEY/ END FRAME | KEY FRAME NUMBER | VIDEO FRAME NUMBER | TOP-LEFT COORDINATE | BOTTOM-RIGHT COORDINATE |
| --- | --- | --- | --- | --- |
| 0 | 1 | 65 | (20, 30) | (40, 70) |
| 0 | 2 | 95 | (20, 30) | (40, 70) |
| 0 | 3 | 120 | (70, 130) | (90, 170) |
| 1 | 4 | 220 | (120, 130) | (140, 170) |
| 0 | 5 | 300 | (120, 130) | (140, 170) |
| 1 | 6 | 400 | (120, 130) | (140, 230) |

The table 2 above describes a hypervideo hyperlink emphasis region encoded in six key frames, namely the video frames 65, 95, 120, 220, 300 and 400. The key frames 220 and 400 are end-frames as indicated by the binary digit 1 in the Key/End Frame column. Those key frames having a 0 Key/End Frame value are not end frames.

In this example, a hypervideo encoded with the hypervideo hyperlink data file information listed in the Table 2 above has a rectangular hypervideo hyperlink emphasis region encoded in the first key frame (video frame 65). The display position of the hypervideo hyperlink emphasis region has a top-left vertex at the coordinates (20,30) and a bottom right vertex at the coordinates (40,70). Thus, the size of the rectangular hypervideo hyperlink emphasis region is 20 pixels (h) by 40 pixels (w).

Still referring to Table 2, the hypervideo hyperlink emphasis region is then encoded by the hypervideo player in the second key frame. The second key frame corresponds to the video frame number 95. The display position of the hypervideo hyperlink emphasis region in the video frame 95 is the same as the display position of the hypervideo hyperlink emphasis region in the video frame 65. The size of the hypervideo hyperlink emphasis region is also unchanged from the first key frame. The display position of the hypervideo hyperlink emphasis region is therefore unchanged for all of the frames between 65 and 95, inclusively.

As shown in table 2, the hypervideo hyperlink emphasis region is encoded in a third key frame, the video frame number 120. The display position of the hypervideo hyperlink emphasis region in the third key frame has a top-left vertex at the coordinates (70,130) and a bottom right vertex at the coordinates (90,170). Thus, the size of the hypervideo hyperlink emphasis region is 20 pixels (h) by 40 pixels (w). Although the size of the hypervideo hyperlink emphasis region is unchanged as compared to the second key frame, the hypervideo hyperlink emphasis region is located at a different display position than the second key frame. The hypervideo hyperlink emphasis region is shifted down 50 pixels and to the right 100 pixels as compared to the second key frame. The display position of the hypervideo hyperlink emphasis region for the video frames between video 95 and 120 is somewhere between the hypervideo hyperlink emphasis region's position in the second key frame (video frame 95) and its position in the third key frame (video frame 120). The exact display position of the hypervideo hyperlink emphasis region between the second and third key frame is determined by interpolation as described above. The size of the hypervideo hyperlink emphasis region is preferably maintained at 20 pixels(h) by 40 pixels(w) between the second and third key frames (video frames 95–120).

The hypervideo hyperlink emphasis region is further encoded in a fourth key frame, the video frame number 220. Again, the size of the hypervideo hyperlink emphasis region is 20 pixels(h) by 40 pixels(w). The display position of the hypervideo hyperlink emphasis region is changed from the third key frame. The display position of the hypervideo hyperlink emphasis region has a top-left vertex at the coordinates (120,130) and a bottom right vertex at the coordinates (140,170). The hypervideo hyperlink emphasis region is shifted down by 50 pixels as compared to its display position in the third key frame. The display position of the hypervideo hyperlink emphasis region for the video frames between 120 and 220 is somewhere between the hypervideo hyperlink emphasis region's display position in video frame 120 and its position in frame 220 and is specifically determined by interpolation by the hypervideo player.

The hypervideo hyperlink emphasis region is encoded in a fifth key frame, the video frame number 300. The hypervideo hyperlink emphasis region's top-left vertex is at the coordinates (120,130) and its bottom-right vertex is at the coordinates (140,170). The fourth key frame, the video frame number 220, is the first key frame for the video frames 221–299 sandwiched between the key frames 220 and 300. The fourth key frame is also an end-frame. Therefore, the hypervideo player will not produce a hypervideo hyperlink emphasis region for the object ObjectName for the frames 221 to 299, as determined by the FRAME_CHECK 230 function described earlier. See FIG. 4.

The hypervideo hyperlink emphasis region is encoded in a sixth key frame, the video frame number 400. The hypervideo hyperlink emphasis region's top-left vertex is at the coordinates (120,130) and its bottom-right vertex is at the coordinates (140,230). The size of the hypervideo hyperlink emphasis region is changed from the fifth key frame. In this case, the hypervideo player preferably interpolates such data to yield a hypervideo hyperlink emphasis region of increasing size between the video frames 300 and 400. The sixth key frame is also an end-frame.

As the above example illustrates, the hypervideo player determines the display position for the hypervideo hyperlink emphasis region for all of the hypervideo frames associated with the hypervideo hyperlink. This is true even though the hypervideo hyperlink emphasis region's display location and size data is only encoded in the hypervideo data file and the hypervideo at key frames. Those skilled in the art will appreciate that the hypervideo player can process the hypervideo data files and hypervideos encoded in accordance with the present invention faster and with less system resources than conventional hypervideo players.

While the hypervideo player has been described primarily in the context of playing hypervideos up until this point, at least one embodiment of the hypervideo player has authoring capabilities. That is, the hypervideo player is capable of creating and editing hypervideo data files and hypervideos formatted as described above. In the FIG. 6, the OPEN_HVF 400 function initiates a hypervideo player having authoring capabilities. The OPEN_HVF 400 function either opens an existing hypervideo data file or creates a new (empty) hypervideo data file. The OPEN_VIDEO 405 function is part of a HYPERVIDEO PREVIEWER 480. The OPEN_VIDEO 405 function opens a video file that will be associated with the hypervideo data file opened by the OPEN_HVF 400 function. The HYPERVIDEO PREVIEWER 480 decodes the video frame by frame, integrates the information contained in the associated hypervideo data file (if any) with the video frame image data contained in the video file, and outputs the resultant hypervideo frame image to a display for preview viewing.

The functionality of the HYPERVIDEO PREVIEWER 480 is similar to the hypervideo player described above. However, unlike the previously described hypervideo player that uses interpolation to determine the display position of a hypervideo hyperlink emphasis region in non-key frames, the HYPERVIDEO PREVIEWER 480 only determines and displays the hypervideo hyperlink emphasis region at key frame specified display positions. The hypervideo hyperlink emphasis region in video frames intermediate to key frames have display positions matching the last key frame specified display position. Therefore, referring to the table 2, the display position for the hypervideo hyperlink emphasis region between the first and second key frames is the same as the display position in the first key frame.

The HYPERVIDEO PREVIEWER 480 includes functionality to allow a user to "navigate" through hypervideo files using video player control functions such as play/stop, seek, step forward and step backward. These functions permit a user to locate the exact position(s) in a video or hypervideo file that will be encoded with new or edited hypervideo data.

The ENCODE 415 function identifies whether a video frame of video will be encoded with hypervideo hyperlink data. The ENCODE 415 function and the HYPERVIDEO PREVIEWER 480 operate in a recursive fashion until a previewed video frame, which is scheduled to be encoded with new hypervideo data, is encountered. When the ENCODE 415 function identifies that the previewed video frame will be encoded with hypervideo hyperlink data, then a CREATE_HYPERLINK_EMPHASIS_REGION 420 function is invoked. The CREATE_HYPERLINK_EMPHASIS_REGION 420 function is an interactive procedure that enables a user to specify the display position and size of a hypervideo hyperlink emphasis region within the currently previewed video frame. As illustrated above in table 2, the hypervideo hyperlink emphasis region can be defined by specifying the key frame number(s) for the hypervideo hyperlink emphasis region and the top-left and bottom-right vertex pixel coordinates of the rectangular shaped hypervideo hyperlink emphasis region.

Figure 6:
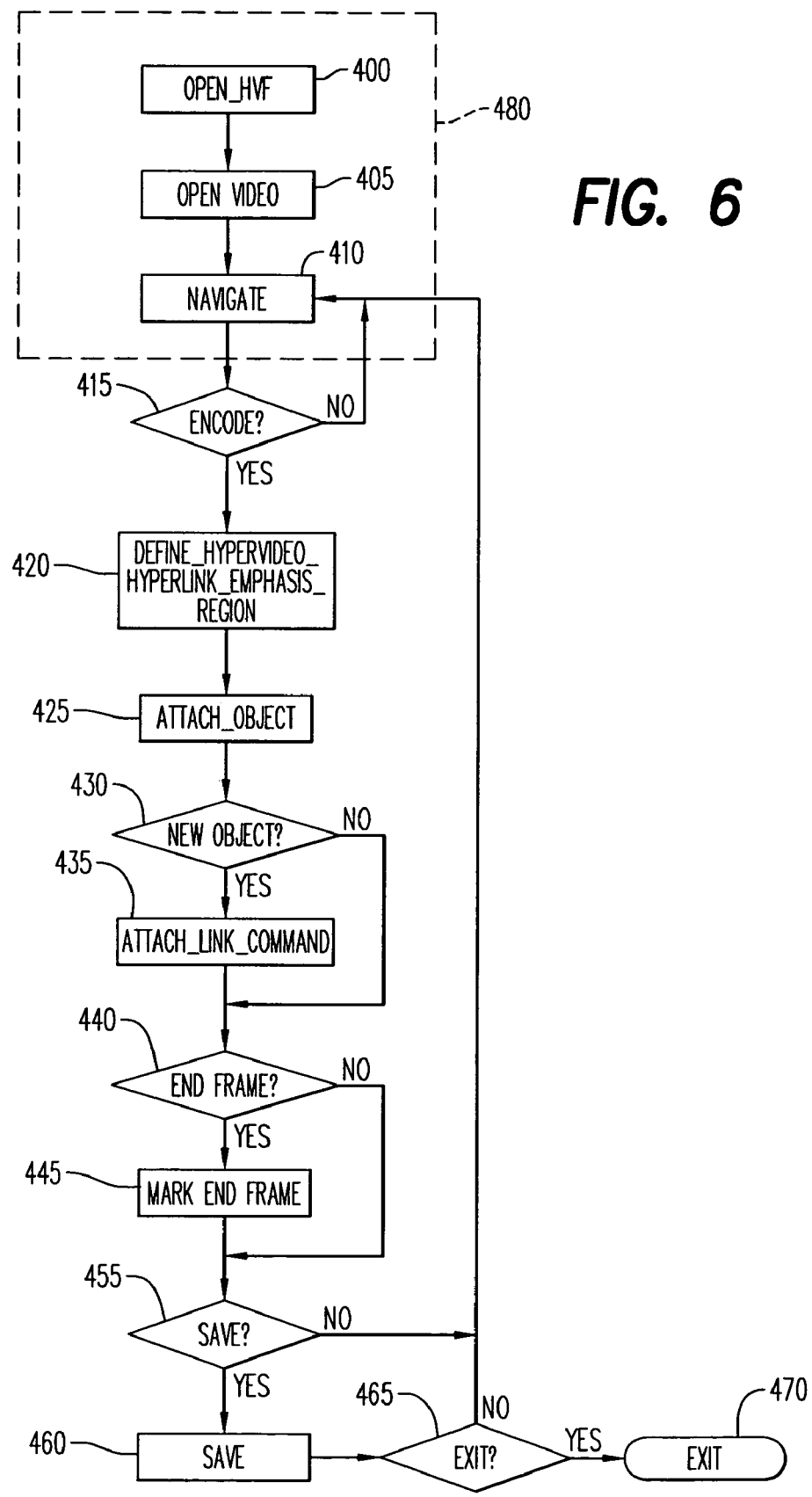
FIG. 6 is a logical flow diagram illustrating a hypervideo player of the present invention.

Still referring to FIG. 6, after defining the hypervideo hyperlink emphasis region, the ATTACH_OBJECT 425 function is invoked to attach the created hypervideo hyperlink emphasis region to an object. The object may already exist and correspond to a previously defined hypervideo hyperlink emphasis region(s) or the object may be a new object. In either case, the object that will be associated with the hypervideo hyperlink emphasis region is specified. The object is typically specified by either typing in a name for the object in an appropriate field, or selecting an object from a list of existing objects.

After attaching the object to the hypervideo hyperlink emphasis region, an ATTACH_LINK_COMMAND 435 function is invoked to attach a link command to the object. If the object is new, then a link command is specified to associate with the object. If the object is not new, then the object may already have an associated link command, in which case the ATTACH_LINK_COMMAND 435 function is bypassed as shown in FIG. 6.

The MARK_END_FRAME 445 function shown in FIG. 6 provides the capability of designating the video frame being encoded as an end frame. The decision to designate the video frame as an end frame is done at step 440. The MARK_END_FRAME 445 function is invoked if the video frame is encoded as an end frame, otherwise the MARK_END_FRAME 445 function is bypassed.

The hypervideo player shown in the FIG. 6 can save (step 460) the encoded hypervideo file and exit (step 470) or continue to create and encode hypervideo data by recursively returning to the NAVIGATE 410 function and encoding the same or other hypervideo data, including hyperlinks emphasis region(s) and object(s), at the same or at different key video frame(s). The hypervideo player preferably includes functionality to undo executed steps.

Figure 5:
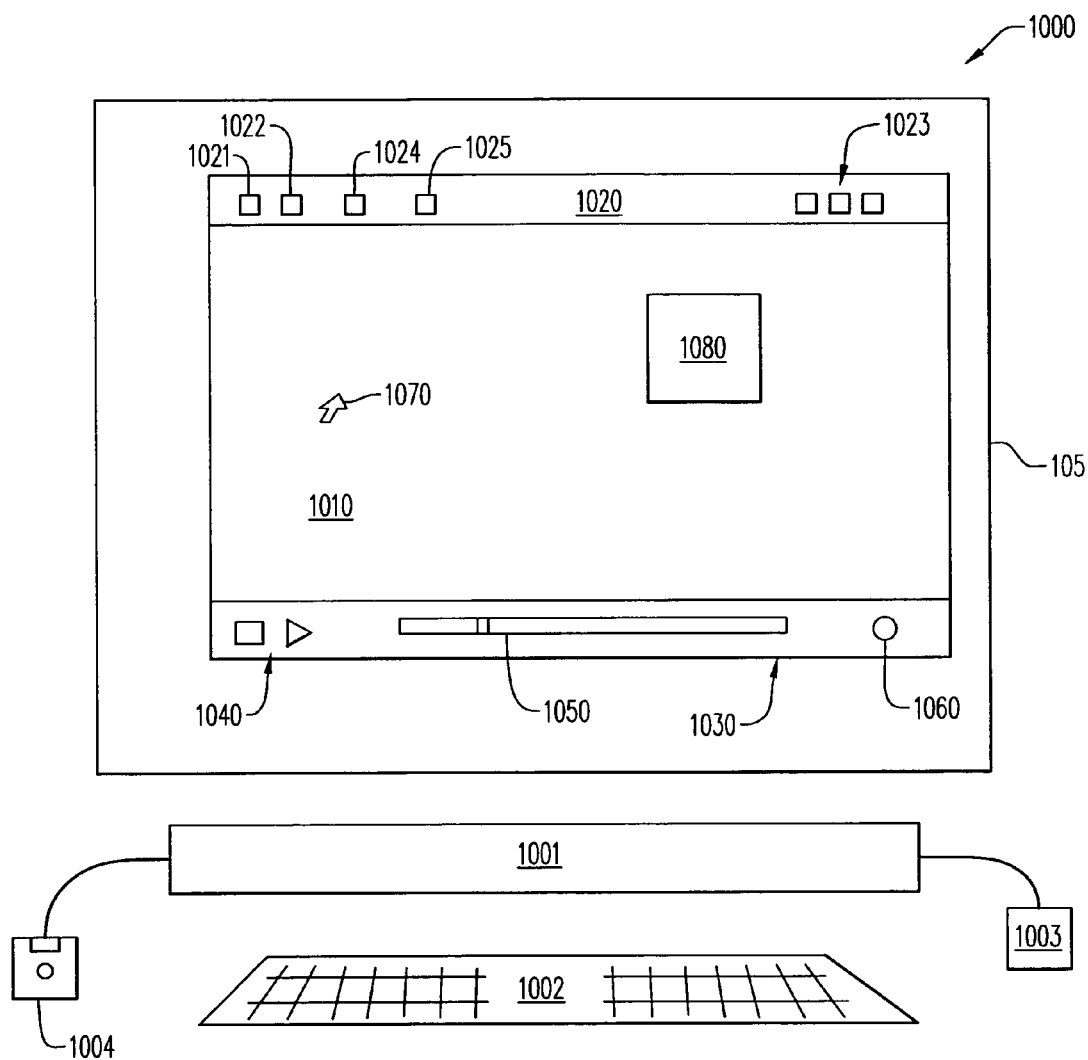
FIG. 5 illustrates a hypervideo display system for the hypervideo player of FIG. 4.

The hypervideo player may be implemented on computer processing system 100 to appear as shown in FIG. 5. FIG. 5 shows a typical personal computer having a monitor 105; a keyboard 1002; speakers 1003 and 1004; and a housing 1001 enclosing the memory 101, CPU 103, storage devices 108, etc. The monitor 105 has a display screen 1010. In FIG. 5, video is being displayed on a computer monitor 105 and the computer system 100 is also connected via a communications link to the Internet.

With regards to FIG. 5, the hypervideo player implemented on computer processing system 100 displays hypervideo in the video display window 1010. The video window can be moved or resized per conventional methods. Located in the top border 1020 is an active file button 1021 which is used for initiating actions such as starting and exiting the video player program. The active button 1022 is used for displaying an options menu. The group of active buttons 1023 are for minimizing/maximizing the display window and for fast termination of the hypervideo player. Beneath the display window 1010 is a panel bar 1030 which contains hypervideo player control buttons 1040 for controlling typical video functions such as play and stop/pause, and an slider bar 1050 for controlling random access to different locations in the video.

The hypervideo displayed in video window 1010 is displayed as both video and an accompanying hypervideo hyperlink emphasis region 1080. A text descriptor is usually displayed in the hypervideo hyperlink emphasis region to provide the user additional information concerning the linked content.

Also located on the panel bar 1030 is a hypervideo hyperlink emphasis region light 1060 for visually indicating if the interval of hypervideo being displayed is encoded with hypervideo hyperlinks. The hypervideo hyperlink emphasis region light 1060 changes states to indicate if hypervideo hyperlinks are encoded in the displayed interval of hypervideo.

Preferably, when the cursor 1070 is inside the display window 1010 and there is a hypervideo hyperlink encoded in the currently displayed video, there is either a color change to the hypervideo hyperlink emphasis region or a visually distinct border that delineates the hypervideo hyperlink emphasis region. The particular hypervideo hyperlink emphasis display attribute displayed is user-selectable, typically via an options menu.

In a preferred embodiment, if a hypervideo hyperlink within the hypervideo hyperlink emphasis region 1080 is activated, the hypervideo being played by the hypervideo player is paused while the hypervideo hyperlink executes its link command(s). The user can resume playing the hypervideo at the last viewed hypervideo position upon complete execution of the link command. This feature of the invention allows the user to view the linked content without missing any of the hypervideo. This function is achieved by either a pause command on the hypervideo player if the hypervideo file is a local file, or by transmitting a pause request to the URL from which the hypervideo being downloaded or streamed, and having the remote location issue a pause command to stop the streaming hypervideo. If the linked URL does not support a pause command, then the hypervideo will continue to play. The user typically has the option to minimize the video display window 1010 while viewing linked content.

The hypervideo player typically provides the user with the option to switch hypervideo hyperlink emphasis region display attributes on or off. In certain embodiments, when the hypervideo player is initiated, the hypervideo hyperlink emphasis region display attributes switch 1024 located in the upper panel bar is set to "display attributes" off. In this case, activating button 1024 causes the hypervideo hyperlink emphasis region display attributes to be activated, i.e., turned on. The switch 1024 is designed so that hypervideo user can quickly distinguish the current state of the switch (e.g., by changing colors).

When viewing the hypervideo in a full screen mode, the option buttons located in the lower panel bar 1030 and the upper panel bar 1020 are hidden from view and embedded in the video display window. To view the option buttons, the video window 1010 is preferably first reduced to its normal, less than full screen size as shown in FIG. 5 to reveal the option buttons in the upper and lower panel.

The hypervideo player of the present invention provides options for various forms of user-selectable display attributes for hypervideo hyperlink emphasis regions. The preferred embodiment includes four main hypervideo hyperlink emphasis regions display attributes: 1) surrounding the hypervideo hyperlink emphasis region with a white border; 2) displaying the hypervideo hyperlink emphasis region as a specific color; 3) displaying the hypervideo hyperlink emphasis region in gray-scale (i.e., black-and-white) video, while the rest of the video is in color; and 4) displaying the hypervideo hyperlink emphasis region in reverse color mode. While only four display attributes have been discussed in the current embodiment of the invention, the invention may have more, less and different user-selectable hypervideo hyperlink emphasis region display attributes without departing from the scope of the invention.

Another featured option of the hypervideo player provides the capability to save the URLs of activated hypervideo hyperlinks in a special bookmark file, i.e., a history of the URL's visited from the hypervideo. The bookmark file would preferably be an html formatted (or other browser readable language) file that could be opened in a browser.

Figure 7:
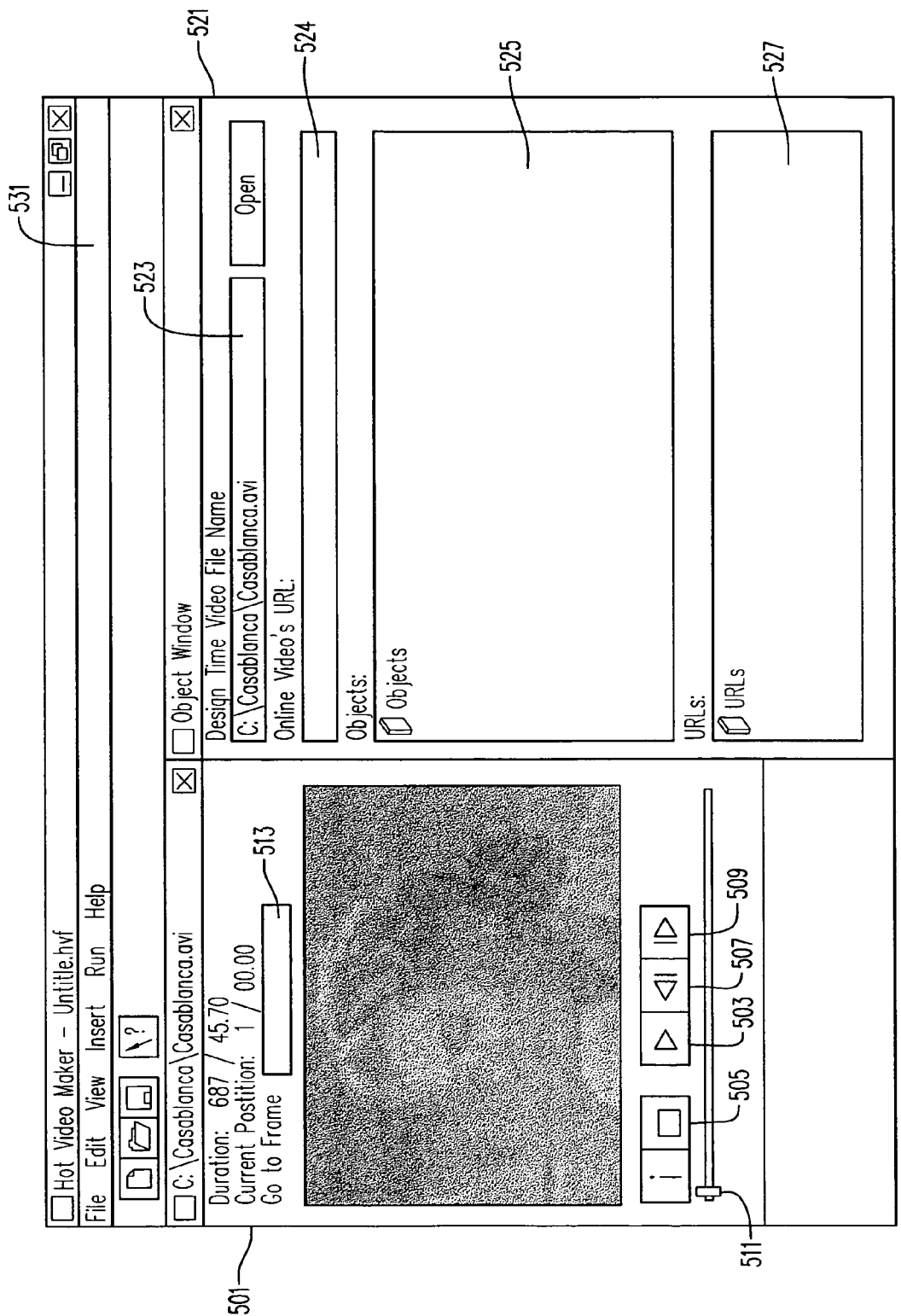
FIGS. 7 and 8 are illustrations of an example of a hypervideo display system graphical user interface for the system FIG. 6.

The FIG. 7 illustrates an example of the hypervideo player shown in the FIG. 6 and embodied in a personal computer having a graphical user interface. As shown in FIG. 7, a video window 501 is positioned on the left side of the display screen area. The video and hypervideo hyperlink emphasis regions are displayed and activated via video player function buttons such as a play/stop button 503; a step backward button 507; a step forward button 509; a random seek slider 511; and an on/off hypervideo hyperlink emphasis region button 505.

Located on the right side of the display area, is the object window 521. The object window 521 has an area 523 designated for the name and location of the file being encoded; an URL area 524, that displays the location for the associated video file (e.g., a remotely located URL); an object listing area 525, for listing the objects in terms of their location, hypervideo hyperlink emphasis region key frame(s) and coordinates; and a list of URL links 527 associated with the defined objects in object area 525.

When the hypervideo player is started, the tool window 531 is preferably displayed. If a new hypervideo will be created, then the menu option New is selected from a File menu. An Open button (not shown) in the object window 521 is then used to load a video file that will be encoded with a hypervideo data file. If a hypervideo or hypervideo data file is being edited or further modified, then the menu option Open (not shown) is chosen from the File menu. In this case, the object window 521 is opened to display hypervideo data file(s) or hypervideo file(s) that can be selected from for further hypervideo data encoding.

To encode an object, the user navigates through frames of video to the desired video frame that will be encoded with hypervideo data using the navigational buttons 503, 507, 509 and the slider bar 511. Alternatively, a specific frame number may be entered into "Go TO Frame" box 513. Once a key frame is identified, the hypervideo hyperlink emphasis region(s) is defined. This may be accomplished using GUI click and drag techniques to define the rectangle. The defined hypervideo hyperlink emphasis region is then displayed in the video window 501. Preferably, the information regarding the hypervideo hyperlink emphasis region, its coordinates and the URL it refers to are listed in an area at the bottom of the video window 501.

The geometry of a hypervideo hyperlink emphasis region can be edited. For example, a hypervideo hyperlink emphasis region displayed in the video window 501 may be resized, cut or deleted.

Once the hypervideo hyperlink emphasis region is defined, the hypervideo hyperlink emphasis region is associated with an object. The hypervideo hyperlink emphasis region can be associated with an object via a pop-up menu that lists existing objects. Alternatively, an object may be associated with the hypervideo hyperlink emphasis region from a new object selection that initiates the function for defining new objects.

If the hypervideo hyperlink emphasis region is associated with an existing object, then the hypervideo player automatically enters the existing information in the appropriate place in the object window 525. For a new object, a new object window will pop up and prompt the user for the requisite information. Namely, the object name and the link command associated with the object will be requested. Also available in the pop up window will be a list of previously used link commands to facilitate encoding. Preferably, some attribute of the hypervideo hyperlink emphasis region is updated as editing changes are completed in order to notify the user that the requested changes have been implemented. For example, user notification of to hypervideo hyperlink editing changes can be accomplished by having the border of the hypervideo hyperlink emphasis region from dotted lines to solid lines.

After the user has encoded the hypervideo hyperlink emphasis region in the last key frame of an interval of video, the last key frame is designated an end frame. This is accomplished by specifying the video frame as an end frame in the object box inside the object window 525. The encoding of additional key frames is accomplished by recursively completing the same steps described above.

Preferably, as the hypervideo file is encoded, the HYPERVIDEO PREVIEWER displays the last defined hypervideo hyperlink emphasis region. This feature facilitates encoding frames using the last defined hypervideo hyperlink emphasis region as a relative starting point.

Figure 8:
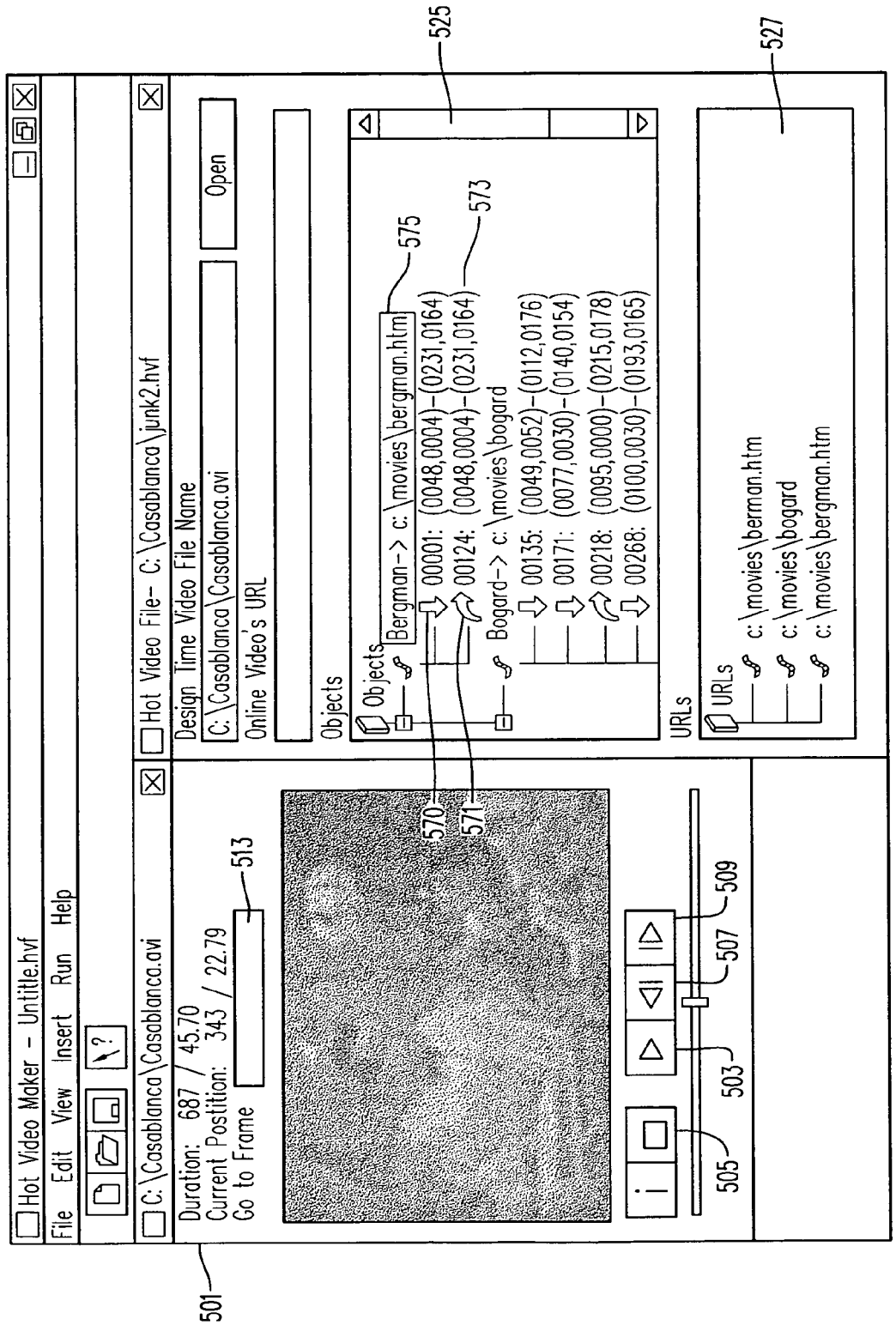

As shown in the FIG. 8, the key frames associated with the objects are visually tagged with arrows 570 to indicate key frames and arrows 571 to indicate end frames. This feature allows for quick and easy editing of hypervideo files. If an end frame is edited to a key frame, then the end frame arrow 570 will change form and become a key frame arrow 571, thereby alerting the user that the change has taken place.

Preferably, selecting any frame label 573 in the objects box of object window 525 will cause the video in the video window 501 to advance to that frame. Moreover, selecting any object label 575 in the objects box in object window 525 causes the associated key frame information listing to collapse if expanded and conversely, to expand if collapsed.

Figure 9:
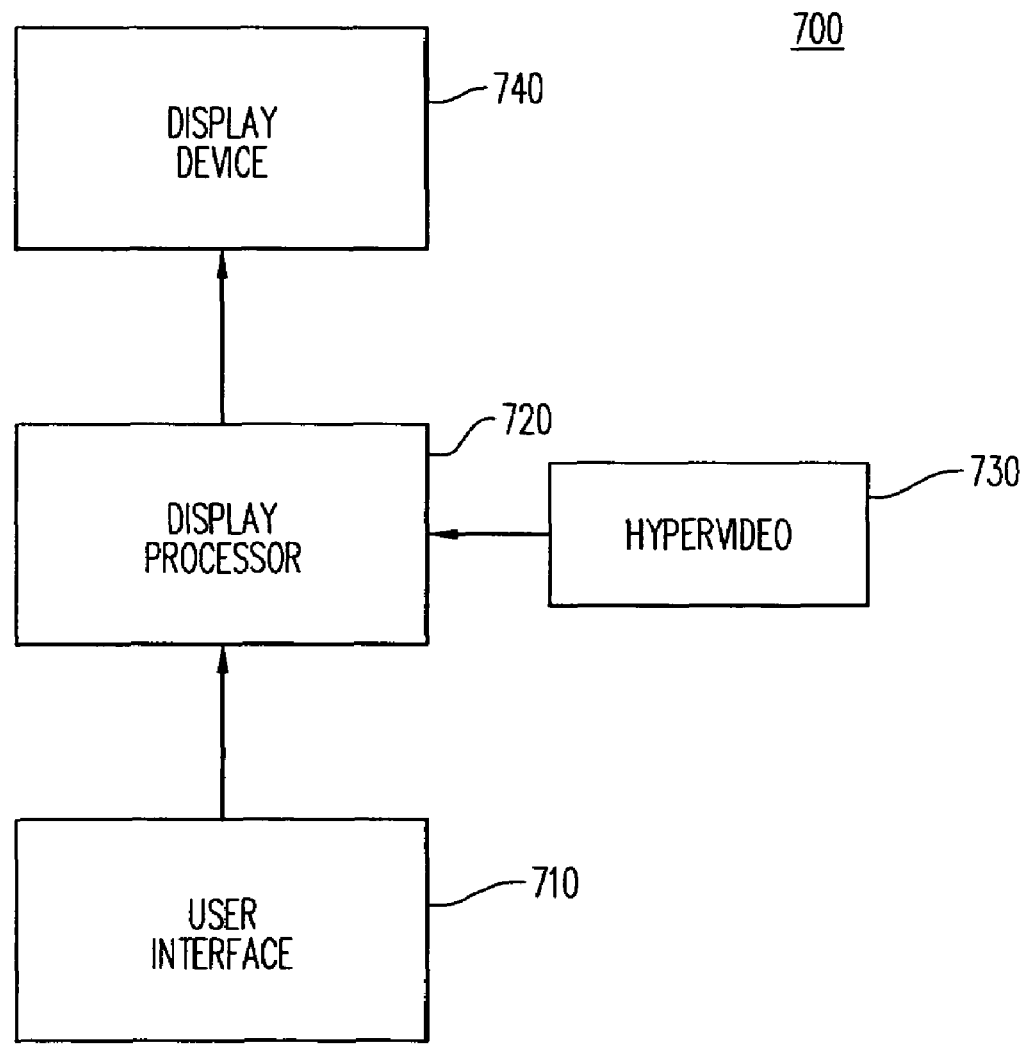
FIG. 9 is a block diagram of a hypervideo player of the present system.

FIG. 9 depicts a block diagram of a hypervideo system 700 embodying the present invention for displaying hypervideos, including the hypervideo hyperlink emphasis regions encoded in the hypervideo. The hypervideo display system 700 comprises a display processor 720 that processes the hypervideo 730, a user interface 710 and a display device 740. The display processor 720 processes the hypervideo data file and the associated video comprising the hypervideo 730 so that the display device 740 can present a display of the hypervideo for viewing by a user of the hypervideo system 700. Processing of the hypervideo 730 may further include processing the hypervideo file 730 by integrating the video file and hypervideo data file comprising the hypervideo file. The display processor 700 also provides user selectable hypervideo hyperlink display attribute options based on the hypervideo data file information encoded in the hypervideo 730 processed by the display processor.

Also provided in the hypervideo display system 700 is a display device 740 for displaying the processed hypervideo of display processor 720. The display device 740 may be a computer monitor or screen but is not limited to being a computer monitor or screen. The display device may comprise a LCD type display, a television (including, but not limited to high definition television), a personal digital assistant screen, a mobile phone screen, etc.

The user interface 710 enables a user of the hypervideo system 700 to selectively activate at least one user selectable display attribute for the hypervideo hyperlink emphasis regions presented on the display 740. The user may selectively specify the display attributes of the hypervideo hyperlink emphasis regions displayed, at the time of viewing, by the display device 740. The user interface may be a GUI but is not limited to being a GUI-type of interface.

It should be understood that the foregoing description is only illustrative of the invention. Various alternatives and modifications can be devised by those skilled in the art without departing from the invention. For example, the hypervideo hyperlink emphasis region button 505 can be eliminated, and the switching function can be achieved by moving the cursor in or out of the video window. This choice can be dynamically invoked by moving the cursor out of or into the video display window. Also, text-based descriptors can be overlaid on top of the video itself, similar to captioning. At any given time period, more than one hypervideo hyperlink and hypervideo hyperlink emphasis region may be present in a hypervideo and simultaneously displayed.

We claim:

1. A method for indicating a location of time dependent video hypervideo hyperlinks to a user, comprising the steps of:
displaying a video presentation on at least a portion of a display device screen, said video presentation including a hypervideo hyperlink emphasis region;
providing the user, at time of viewing, with at least one user selectable display attribute for said hypervideo hyperlink emphasis region; and
displaying said display attribute on said display device screen,
wherein at least one of said user selectable display attribute comprises at least one of displaying said hypervideo hyperlink emphasis region in gray scale only format, and displaying said hypervideo hyperlink emphasis region in reverse-color mode format.

2. The method of claim 1 further comprising the step of displaying to the user, at the time of viewing, an options menu listing said at least one user selectable display attributes, wherein said displaying of said options menu is selectively controlled by the user.

3. The method of claim 2 wherein the user selectively controls the displaying of said options menu by positioning a user-controlled cursor in a specified emphasis region of said display device screen.

4. The method of claim 1 further comprising the steps of:
opening a hypervideo data file;
decoding a video file associated with said hypervideo data file; and
encoding the decoded video file with a hypervideo hyperlink emphasis region in at least one key frame.

5. A hypervideo player system for indicating hypervideo hyperlinks to a user, comprising:
a display processor processing a hypervideo, said hypervideo comprising video and hypervideo hyperlink data, including at least one hypervideo hyperlink emphasis region, encoded therein, and said processing comprises determining the display location of said at least one hypervideo hyperlink emphasis region;
a user interface enabling a user of said hypervideo display system to selectively activate, at the time of viewing, at least one user selectable display attribute for said hypervideo hyperlink emphasis region; and
a display device displaying said processed hypervideo and displaying said display attribute,
wherein at least one of said user selectable display attribute comprises at least one of displaying said hypervideo hyperlink emphasis region in gray scale only format, and displaying said hypervideo hyperlink emphasis region in reverse-color mode format.

6. The hypervideo display system of claim 5 wherein said display processor further processes said hypervideo to provide the user, at the time of viewing, an options menu listing at least one of said at least one user selectable display attribute.

7. The hypervideo display system of claim 6 wherein the user selectively controls the displaying of said options menu by positioning a user-controlled cursor in a specified emphasis region of said display device.

8. The hypervideo display system of claim 5 wherein said processing of said hypervideo by said display processor further comprises opening a hypervideo data file, decoding a video file associated with said hypervideo data file and encoding said decoded video file with said hypervideo hyperlink emphasis region in at least one key frame.

9. A method for indicating the location of time dependent hypervideo hyperlink emphasis region to a user, comprising the steps of:
displaying a video presentation on at least a portion of a display device screen, said video presentation including a hypervideo hyperlink emphasis region;
providing the user, at time of viewing said video presentation, the option of selectively viewing said hypervideo hyperlink emphasis region or not viewing said hypervideo hyperlink emphasis region;
providing the user, at time of viewing, with at least one user selectable display attribute for said hypervideo hyperlink emphasis region; and
displaying said display attribute on said display device screen,
wherein at least one of said user selectable display attribute comprises at least one of displaying said hypervideo hyperlink emphasis region in gray scale only format, and displaying said hypervideo hyperlink emphasis region in reverse-color mode format.

10. The method of claim 9 wherein the user selectively controls the displaying of an options menu for said at least one user selectable display attribute by positioning a user controlled cursor in a specified emphasis region of said display device screen.

11. A memory media storing a computer readable program comprising program instructions for indicating the location of time dependent hypervideo hyperlink emphasis region of a hypervideo to a user, said memory media comprising:
program instructions for displaying a video presentation on at least a portion of a display device screen, said video presentation including a hypervideo hyperlink emphasis region;
program instructions providing the user, at time of viewing said video presentation, the option of selectively viewing said hypervideo hyperlink emphasis region or not viewing said hypervideo hyperlink emphasis region;
program instructions for providing at least one of said user selectable display attribute comprising at least one of displaying said hypervideo hyperlink emphasis region in gray scale only format, and displaying said hypervideo hyperlink emphasis region in reverse-color mode format; and
program instructions for displaying said display attribute on said display device screen.

12. The memory media of claim 11 further comprising program instructions for providing the user selective control of the displaying of an options menu for said at least one user selectable display attribute by positioning a user controlled cursor in a specified emphasis region of said display device screen.

* * * * *